United States Patent [19]
Svensson et al.

[11] Patent Number: 5,870,293
[45] Date of Patent: Feb. 9, 1999

[54] SYSTEM FOR SIGNALLING POWER UNBALANCE BETWEEN ELECTRIC POWER STATIONS

[75] Inventors: Kjell Svensson, Ludvika; Rolf Palsson, Saxdalen, both of Sweden

[73] Assignee: Asea Brown Boveri AB, Västerås, Sweden

[21] Appl. No.: 950,765

[22] Filed: Oct. 15, 1997

[30] Foreign Application Priority Data

Mar. 24, 1997 [SE] Sweden .................................. 9701058

[51] Int. Cl.⁶ .................................................. H02M 5/45
[52] U.S. Cl. ................................................ 363/37; 363/35
[58] Field of Search .................................. 363/34, 35, 37, 363/40, 45, 46

[56] References Cited

U.S. PATENT DOCUMENTS

| | | | |
|---|---|---|---|
| 4,419,591 | 12/1983 | Irokawa et al. | 307/45 |
| 4,459,492 | 7/1984 | Rogowsky | 307/82 |
| 4,689,733 | 8/1987 | Guth et al. | 363/35 |
| 4,797,799 | 1/1989 | Inokuchi et al. | 363/37 |
| 4,941,079 | 7/1990 | Ooi | 363/132 |
| 5,010,467 | 4/1991 | Tokiwa et al. | 363/37 |
| 5,412,557 | 5/1995 | Lauw | 363/37 |
| 5,535,113 | 7/1996 | Konishi | 363/35 |
| 5,627,735 | 5/1997 | Bjoklund et al. | 363/35 |

*Primary Examiner*—Matthew Nguyen
*Attorney, Agent, or Firm*—Pollock, Vande Sande & Amernick

[57] ABSTRACT

A system for transmitting electric power between a direct voltage network and alternating voltage networks through VSC-converters. A first station which transmits electric power is in voltage regulating mode. Switching members at a second station are adapted to be alternatingly switched in and out upon occurrence of a sudden change of power so as to alternatingly connect one of the poles of the direct voltage network through an associated resistance to ground. A ground current generated therethrough is detected by a ground current measuring member of the first station, which is thereby informed about the unbalance. The first station then takes corrective measures to reduce or eliminate the unbalance.

12 Claims, 2 Drawing Sheets

SYSTEM FOR SIGNALLING POWER UNBALANCE BETWEEN ELECTRIC POWER STATIONS

BACKGROUND OF THE INVENTION

The present invention relates to a system for transmitting electric power. A direct voltage network is connected to at least two alternating voltage networks through a respective power station. The power stations transmit electric power between the direct voltage network and the respective alternating voltage network. Each station includes at least one VSC-converter adapted to convert direct voltage to alternating voltage, and conversely, to convert alternating voltage to direct voltage. An apparatus of a first station regulates the direct voltage of the direct voltage network at the first station to a predetermined nominal value. The station detects the occurrence of a predetermined unbalanced state at the converter of the second station, and upon such detection, controls a switching member to connect the direct voltage network at the first station through a resistor to ground for shunting electric power and thereby restore the direct voltage of the network to the nominal value.

Such a system has recently become known through the thesis "PWM and Control of Two and Three Level High Power Voltage Source Converters" by Anders Lindberg, Kungliga Tekniska Högskolan, Stockholm, 1995. The publication describes a system for transmitting electric power through a direct voltage network for High Voltage Direct Current (HVDC). It points out that the invention is not restricted to this application, but for purposes of describing the invention, the application of the invention to systems of the type defined above is illustrative.

Prior to the issuance of the thesis, facilities for transmitting high voltage direct current through a direct voltage network used a line-coummutated CSC (Current Source Converter) converter in power transmission stations. The development of IGBTs (Insulated Gate Bipolar Transistor, i.e., a bipolar transistor having an insulated gate) has resulted in a circuit component for high voltage applications which is suitable for connecting in series to form valves in converters, since they may easily be turned on and turned off. These VSC (Voltage Source Converter) converters for forced commutation are now an alternative to the commutated CSCs for transmission of electric power between a direct voltage network for supplying High Voltage Direct Current, and alternating voltage networks. They offer several important advantages with respect to line-commutated CSCs in HVDC, including control of active and reactive power flow independently of each other without the risk of commutation failures in the converter, or the risk of transmission of commutation failures between different HVDC links which may take place in a line-commutated CSC. Furthermore, there is the possibility of feeding a weak alternating voltage network or a network that does not generate its own power (a "dead" alternating voltage network) as well as other advantages.

In a plant of the type which converts a direct voltage network to two alternating voltage networks using VSC-converters, the direct voltage of the direct voltage network is determined by one of its power stations. It is desirable to manage a power unbalance, i.e., when the active power fed into the direct voltage network differs from the active power fed out from the direct voltage network, without any rapid telecommunication between the station with the voltage regulating apparatus and the other stations along the direct voltage network. The most probable unbalance occurs when a station is blocked out of operation as a protective measure. Blocking may have many different causes, such as an occurrence of an over-voltage or an over current condition, of the station, or a detected internal failure. If the flow of active power before the blocking of the station was from the direct voltage network to the alternating voltage network, the direct voltage will increase after the converter of the station is blocked.

To limit the resulting over-voltage occurring in the direct voltage network, switching members connect the direct voltage network connected to the station through a resistor to ground for shunting or draining electric power from the direct voltage network. The voltage regulating station detects the over-voltage occurring at the direct voltage network, and in response thereto, regulates the voltage by changing the active current orders thereof, so that power fed into the direct voltage network is reduced, or the direction of power transfer is reversed, until the nominal voltage and balance is achieved. A disadvantage of a system of this type is that a voltage regulating station has to detect an over-voltage of the direct voltage network before it takes care of the power unbalance problem. This means that an over-voltage has time to occur in the entire direct voltage network with the risk that other converters will block as a consequence of this over-voltage, resulting in an even higher voltage on the direct voltage network, disabling further converters and accelerating the failure of the stations. Such failures may have very severe consequences.

BRIEF SUMMARY OF THE INVENTION

The object of the present invention is to provide a system which can remedy the occurrence of an unbalanced state of a high voltage network at a converter of a connected station.

This object is, according to the invention, realized by connecting both poles of the direct voltage network at a converter of the station to ground through a switching member and a resistor. The two poles of the direct voltage network are, at the converter of the station, connectable to ground through the switching member and a resistor upon detection of an unbalance state of said converter. The two switching means arc alternately switched in or out so as to generate a pulsating direct voltage on the two poles. A second voltage regulating station connected to the direct voltage network is provided with a member to measure the ground current generated between the two poles as a consequence of the alternating switching. The measured information is used by the voltage regulating station to correct the unbalance.

By alternating switching of the poles through a resistor to ground upon occurrence of an unbalance state, and detecting the ground current generated in response to the switching at the voltage regulating station, provides information about the occurrence of an unbalance before any real over-voltage has been generated on the direct voltage network, so that the apparatus of the voltage regulating station may intervene and re-establish power balance before the over-voltage in the direct voltage network has had time to increase to any level that would risk the blocking of further converters in the system. Thus, the voltage regulating station receives from the ground current very early information about the power unbalance, without any need for fast telecommunication between the stations of the system Another advantage provided by the invention is that early voltage regulation requires less power to be shunted in a shorter time through the shunt resistors, so that the resistors may be made smaller and less costly.

According to a preferred embodiment of the invention, means are adapted to detect blocking of the converter of the station as the predetermined unbalance state. It is often appropriate to signal the voltage regulating station that a power unbalance has been reached as soon as a self protection has been triggered and the converter has been blocked.

According to another preferred embodiment of the invention, the system comprises members for measuring the direct voltage of the direct voltage network at the station, and means are adapted to start switching the switching members and thus signalling the regulating station when the direct voltage measured exceeds a predetermined level. It is possible to make the voltage regulating station intervene to re-establish power balance of the plant before any converter has been blocked which may be, in some cases, desirable.

According to another preferred embodiment of the invention, the voltage regulating station is adapted to register the occurrence of the predetermined unbalance state of the converter at the other station upon measuring a predetermined number of ground current pulses following each other through the ground current measuring member. Inhibiting the voltage regulating station from reacting to a different transient phenomena of the direct voltage network is provided by requiring a predetermined number of such ground current pulses for registering an unbalanced state.

According to other preferred embodiments of the invention, the system includes more than two stations for connecting alternating voltage networks to the direct voltage network, and it comprises more than one station which can signal to the regulating station an unbalanced state. This means that the voltage regulating station may, in a system having more than two stations, be informed about an unbalance state by either of the two stations and take care of the unbalance.

According to another preferred embodiment of the invention, a first as, well as a second station, has two switching members for connecting the two poles of the direct voltage network through a resistor to ground. Upon detection of said unbalance state of a converter of the respective station, the two switching members are alternately switched in and out, as well as a member connected to ground. The power stations are also adapted to measure the ground current generated by the switching members of another station in the system being alternately switched in and out. The first, as well as the second station, are adapted to regulate the direct voltage of the direct voltage network through a converter. A said re-establishment of the power balance of the plant may be obtained irrespective of where the unbalance occurs, i.e., for example, irrespective of which converter is blocked, and with the possibility to regulate voltage in the station where it is most appropriate.

According to a further preferred embodiment of the invention, the system is adapted for transmitting electric power through a direct voltage network for High Voltage Direct Current (HVDC). The advantages of the invention are particularly apparent in this preferred application.

Further advantages and advantageous features of the invention will appear from the following description.

BRIEF DESCRIPTION OF THE DRAWINGS

With reference to the appended drawing, below follows a description of a preferred embodiment of the invention.

DETAILED DESCRIPTION OF THE INVENTION

Figure 1:
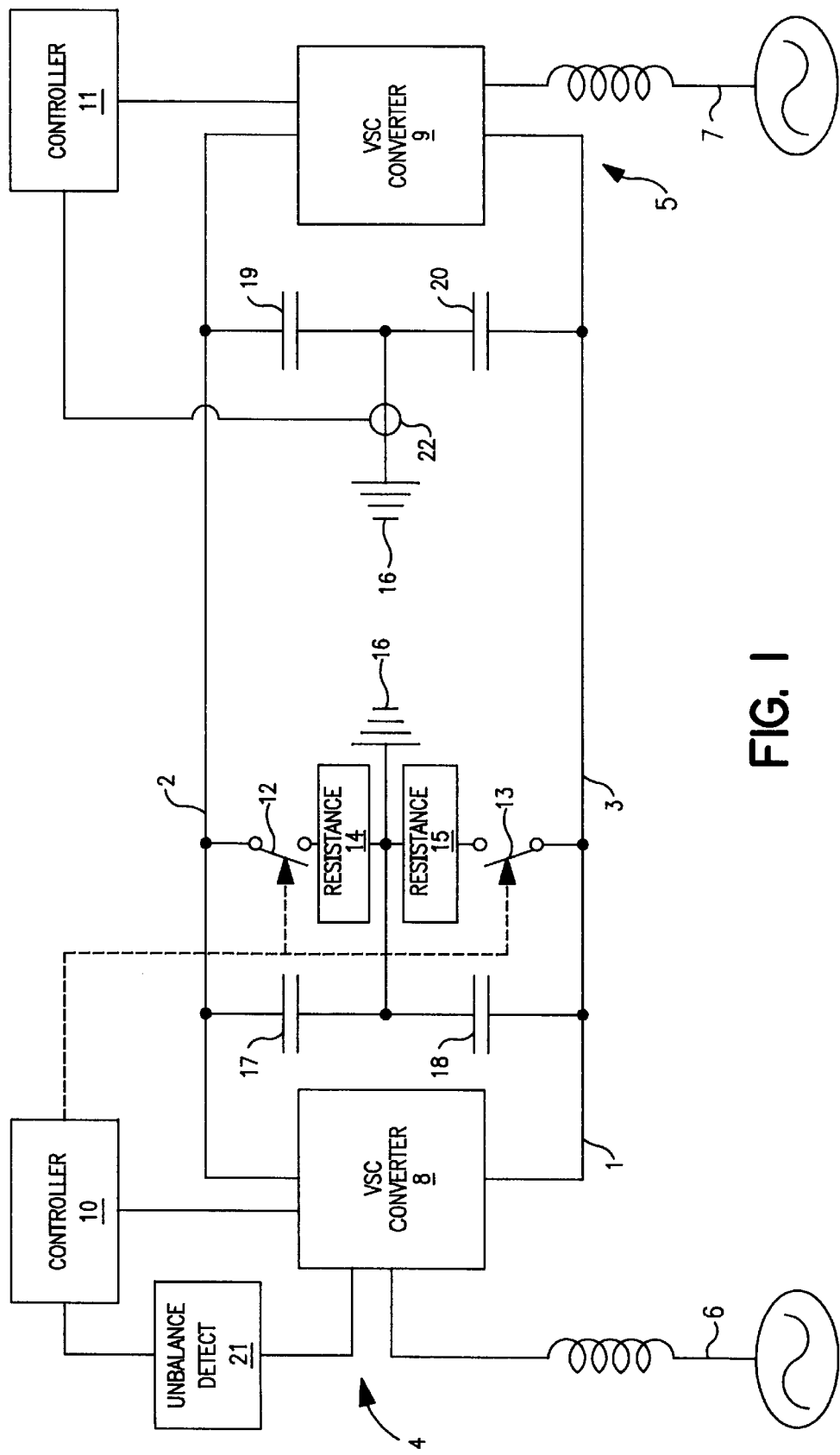
FIG. 1 is a schematic diagram illustrating the principles of the invention.

A structure of a system for transmitting electric power according to the invention is schematically illustrated in FIG. 1. Only tie components relating to the invention have been shown in the drawing for facilitating the understanding of the invention. The system comprises a direct voltage network having a plus pole 2 and a minus pole 3 for supplying High Voltage Direct Current (HVDC=High Voltage Direct Current). Two alternating voltage networks 6, 7 are connected to the direct voltage network of a respective station 4, 5 of the alternating voltage networks which are indicated by an alternating voltage symbol and an inductance. The stations 4, 5 transmit electric power between the direct voltage network 1 and their respective alternating voltage network. The power may be fed in from an alternating voltage network to the direct voltage network, or fed out from the direct voltage network to an alternating voltage network. Thus, the alternating voltage networks may have electric power generators or only be connected to consumers of electric power.

The stations 4, 5 each comprise at least one VSC-converter 8, 9 to convert direct voltage to alternating voltage and to conversely convert alternating voltage to direct voltage. However, it is possible that each station comprises a plurality of such converters, but these are in the present case summarized through a single box for each station. It is also possible that the alternating voltage networks have more than one phase, i.e., three phases, but the phases of the network networks are summuarized in the drawing through a single line. The respective VSC-converter comprises, in a conventional way, electric valves, which have branches with breakers that turn-on and turn-off, connected in series, preferably in the form of IGBTs, having diodes connected anti-parallel therewith in a conventional way. A great number of IGBTs may, for example, be connected in series to form a single valve, so as to be turned on and turned off simultaneously for functioning as a single breaker, with the voltage drop across the valve being distributed among the different breakers connected in series. Control of the breakers takes place in a conventional way through pulse-width-modulation (PWM).

The stations comprise further a schematically indicated apparatus 10, 11 for controlling the respective converter 8, 9. The first stations 5 are intended to be in voltage regulating mode, meaning that the control apparatus 11 thereof controls the converter 9 for regulating the direct voltage of the direct voltage network to keep the voltage at a determined nominal value. The two poles 2, 3 of the direct voltage network are at a second station 4 connected to ground 16 through a switching member 12, 13 each, which may be turn-on and turn-off type components in the form of IGBTs, and a resistance element 14, 15. Ground 16 is at a potential between the plus and minus pole, and is connected to two capacitors 17, 18 connected to the poles. The first station has corresponding capacitors 19, 20 and ground connection.

The control apparatus 10 of the second station is designed to control the two switching members 12 and 13. The second station 4 has means 21 to detect an occurrence of a predetermined unbalanced state at the converter 8 of station 4. Such an unbalanced state may, for example, mean detecting an increasing voltage of the direct voltage network or triggering of blocking the converter by a protection measure.

Finally, the first station 5 has a member 22 connected between ground 16 and a connection between the capacitors 19 and 20 which are connected to the two poles of the direct voltage network. Member 22 measures the ground current flowing therethrough and sends information relating thereto to the control apparatus 11.

The system described above fictions in the following way when an unbalance occurs at the second station 4. The unbalance may result from an increase of the direct voltage or a blocking of the converter of that station. The unbalance is detected by the means 21, which sends signals to the apparatus 10 for controlling the switching members 12 and 13 to alternately establish and break the connections with ground. This means that the electric power may be shunted through the associated resistor when a switching member 12 or 13 is switched in, which counteracts the power unbalance and the increase of the direct voltage of the direct voltage network. By alternatingly switching the switching members 12 and 13 in an out, a pulsating direct voltage of opposite polarity pulses will be generated on the two poles 2, 3 and a ground current is generated through the member 22 of the voltage regulating station 5. Signals are sent from the member 22 to the control apparatus 11 when the unbalance is detected and begins to reduce the power fed in so as to counteract the unbalance and prevent a rise of the direct voltage of the direct voltage network to harmful levels. Thus, through switching of the switching members 12 and 13 in response to the occurrence of an unbalance, the unbalance state may be detected at the voltage regulating station before the direct voltage of the direct voltage network has increased substantially without any telecommunication between the two stations.

Figure 2:
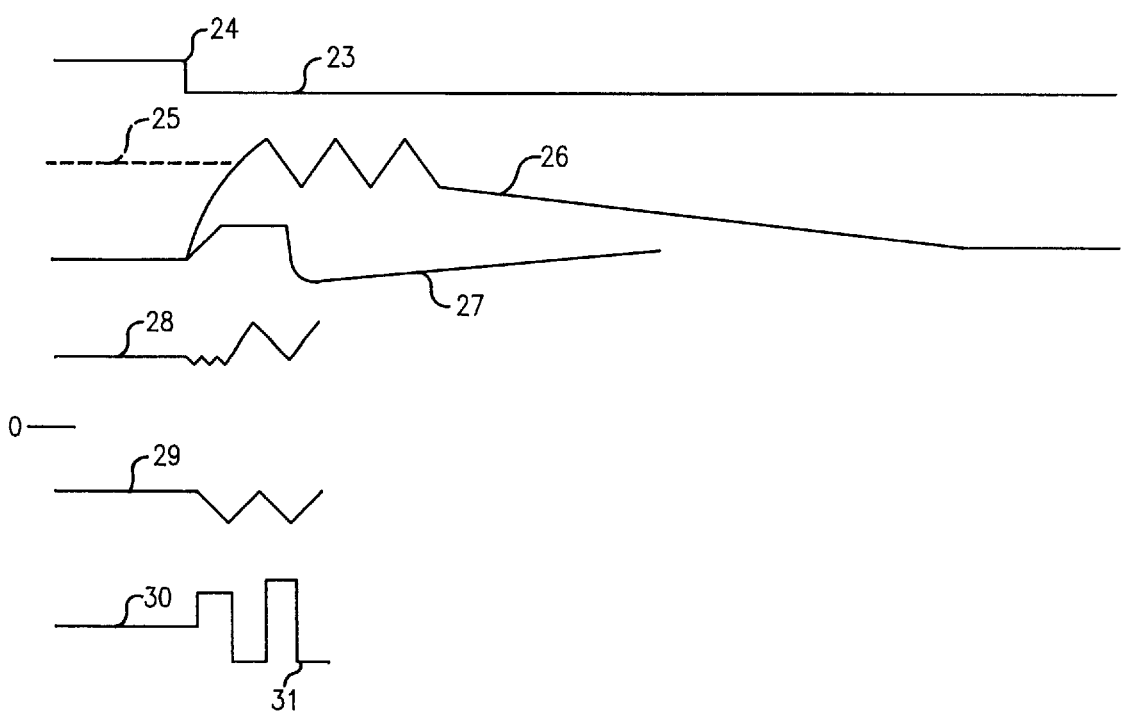
FIG. 2 consists of graphs illustrating the change of some electrical quantities over time upon the occurrence of an unbalance in one of the stations of the system according to FIG. 1.

The development of various electrical quantities over time is illustrated in FIG. 2. Line 23 shows the state of the converter 8 of the second station which is blocked at the point 24. The direct voltage between the two poles of the system for the system already known is shown as line 26. The regulating station detects blocking of a converter of the second station by detecting an increase of the direct voltage of the network 26 over a predetermined level 25. The development of the direct voltage between the poles of a plant according to FIG. 1 is shown by the line 27. Lines 28 and 29 further illustrate the potentials of the poles 2 and 3 of the direct voltage network, respectively, while the line 30 illustrates the ground current measured by member 22. Comparing the lines 26 and 27, it appears that the earlier detection of blocking of the converter of the system according to the invention means that the direct voltage will not increase to he same high level as in the previously known system, so that the risk of disabling other converters and further increases in direct voltage are almost eliminated. Furthermore, the apparatus of the voltage regulating station is designed to first register a certain number of ground current pulses, in the present case three, before it begins the regulation to reestablish the power balance of the system. This avoids unnecessary regulation of different types of transients which do not represent an unbalance state. Thus, the voltage regulating station begins to regulate the unbalance at time 31 on the curve 30.

By controlling the process in this way, it is only necessary to switch the resistors to re-establish the power balance, and the power demands upon the resistors are reduced, so that they may be made smaller and less costly.

The invention is of course not in any way restricted to the embodiment described above, but numerous modifications thereof will be apparent to a person skilled in the art, without departing from the basic idea of the invention.

Although symbols have been indicated in FIG. 1 for certain elements, it is not necessary that these exist as separate components, since the functions they perform may very well be performed by any component having other functions. For example, values need not be measured directly but may be calculated from values of any other quantity measured.

It is also obvious that a system of this type has additional components, such as harmonic filters, different regulating loops, and the like, but these have been omitted, since they are not essential for the present invention.

The concept of "keeping this at a determined nominal value" as used herein also comprises maintaining the direct voltage value within a predetermined interval.

The phrase "through a switching member and a resistor" is to be given a broad meaning and covers the equivalent structure of an arrester where the protection level is set close to the nominal direct voltage. The process will be similar to the case with resistors, but the characteristic of the arrester is strongly nonlinear and the protection level will depend on the current through the arrester.

The foregoing description of the invention illustrates and describes the present invention. Additionally, the disclosure shows and describes only the preferred embodiments of the invention, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

What is claimed is:

1. A system for transmitting electric power comprising:
    a direct voltage network;
    at least two alternating voltage networks;
    a first power station connected to said direct voltage network and one of said alternating voltage networks including:
        converter means for transferring power bidirectionally between said direct voltage network and said one alternating voltage network;
        means for regulating the direct voltage on said connected direct voltage network,
        means for sensing voltage pulses on said direct voltage network representing an unbalance detected by another power station connected to said direct voltage network, said means for sensing being connected to said means for regulating for regulating said direct voltage on said direct voltage network in response to said pulses; and
    a second power station connected to said direct voltage network and another of said alternating voltage networks comprising:
        means for transferring power bi-directionally between said direct voltage network and said another of said alternating voltage networks,
        means for detecting an unbalance on said direct voltage network, and
        means for generating pulses on said direct voltage network for identifying said unbalance to said first power station, whereby said first power station responds thereto by regulating said direct voltage in a direction to correct said unbalance.

2. The system for transmitting power according to claim 1 wherein said means for generating pulses on said direct voltage network comprises:

a first resistor connected at one end to ground, a second resistor connected at one end to ground, and switching means for alternately connecting remaining ends of said first and second resistors to first and second poles of said direct voltage network whereby pulses of an opposite polarity are created on said network in response to said an unbalance detected on said direct voltage network.

3. The system for transmitting power according to claim 1 further comprising means at said second station for shunting power from said direct voltage network until a balance is established on said direct voltage network.

4. The system for transmitting power according to claim 3 wherein said means for shunting power comprises a means for connecting a resistor between said high voltage network and a ground potential.

5. The system for transmitting power according to claim 1, wherein said means for detecting an unbalance detects a blocking of a converter of the second station as said unbalance.

6. The system for transmitting power according to claim 1, wherein said means for detecting an unbalance comprises means for measuring the direct voltage on the direct voltage network at said second station, and pulses are initiated on said direct voltage network when the direct voltage measured exceeds a predetermined level.

7. The system for transmitting power according to claim 1, wherein the means for regulating of the first station registers an occurrence of said unbalance state at said second station when a predetermined number of pulses are sensed.

8. The system for transmitting power according to claim 7, when said predetermined number of pulses is less than five.

9. The system for transmitting power according to claim 1 wherein said first power station includes:

means for detecting an unbalance on said direct voltage network; and means for generating pulses on said direct voltage network which identify to said second power station that an unbalance has been identified by said first station.

10. The system for transmitting power according to claim 9 wherein said second power station includes:

means for detecting pulses on said direct voltage network; and means for regulating the voltage at said second station in response to said detected pulses in a direction to eliminate said unbalance.

11. The system for transmitting power according to claim 1 wherein said converter means is a VSC converter.

12. A system for transmitting power according to claim 1, wherein said means for generating pulses on said direct voltage network comprises switching means for alternately connecting first and second poles of said direct voltage network through a resistance to ground, whereby pulses of an opposite polarity are created on said network in response to said unbalance detected on said direct voltage network.

* * * * *

UNITED STATES PATENT AND TRADEMARK OFFICE
CERTIFICATE OF CORRECTION

PATENT NO. : 5,870,293
DATED     : February 9, 1999
INVENTOR(S): Kjell SVENSSON and Rolf PALSSON It is certified that error appears in the above-identified patent and that said Letters Patent is hereby corrected as shown below:

Column 6,
    line 55, delete "for regulating" (second occurrence).

Signed and Sealed this

Twenty-fifth Day of May, 1999

Attest:

Q. TODD DICKINSON

Attesting Officer       Acting Commissioner of Patents and Trademarks